July 16, 1957      A. E. HARDY      2,799,825
MEASUREMENT OF CATHODE RAY TUBE SCREEN COLOR UNIFORMITY
Filed Jan. 28, 1954
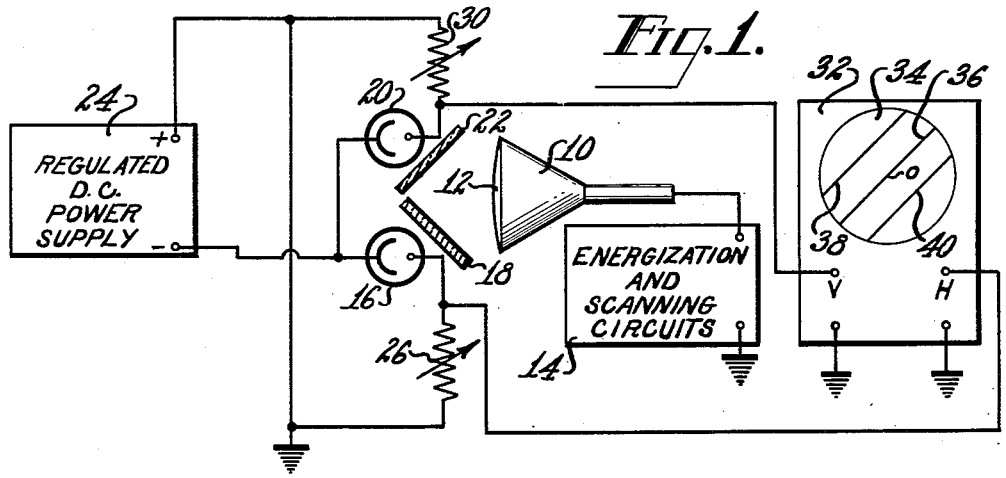
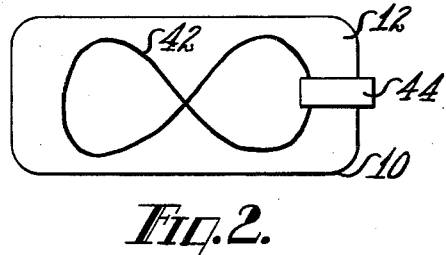
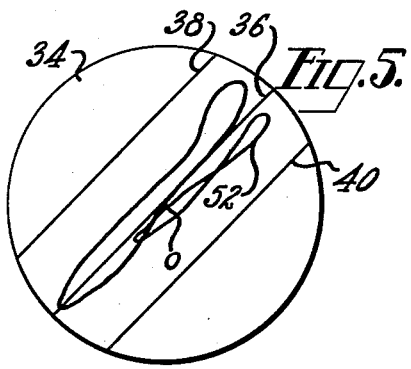
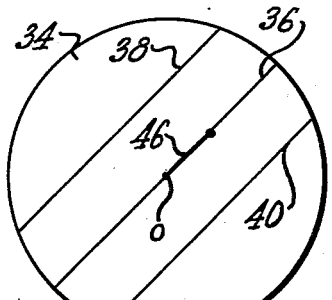
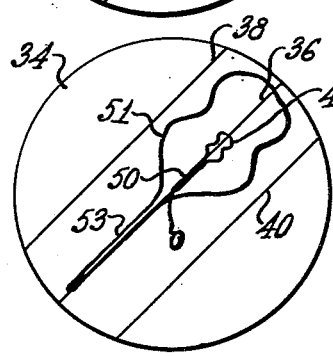
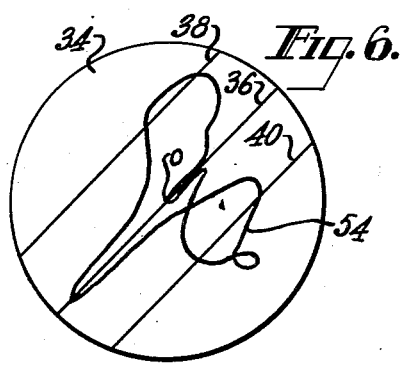
INVENTOR.
AUSTIN E. HARDY
BY *Morris L. Rabkin*
ATTORNEY United States Patent Office 2,799,825
Patented July 16, 1957

2,799,825

MEASUREMENT OF CATHODE RAY TUBE SCREEN COLOR UNIFORMITY

Austin E. Hardy, Lancaster, Pa., assignor to Radio Corporation of America, a corporation of Delaware Application January 28, 1954, Serial No. 406,690

The terminal fifteen years of the term of the patent to be granted has been disclaimed 10 Claims. (Cl. 324—20)

This invention relates generally to the measurement of the color uniformity of fluorescent screens composed of a mixture of at least two fluorescent components. More particularly, the invention relates to a method of testing the color uniformity of cathode ray tube screens, and to an arrangement of apparatus for carrying out this method. While neither specifically nor exclusively limited thereto, the method of testing and the arrangement of apparatus therefor, in accordance with the present invention, are particularly useful in testing the color uniformity of cathode ray tube screens, comprising two or more phosphors, as used in the monochrome television art.

It has been observed that the color uniformity of the light emitted from a cathode ray tube screen may vary from one area of the screen to another on the same tube. In general, this non-uniformity takes the form of a yellow center and blue edges. This non-uniformity is due mainly to a variation in the phosphor screen weight or thickness; the center of the phosphor screen having a relatively greater thickness than the edges thereof. This variation in the thickness of the cathode ray tube screen is an undesirable and unintentional result that occurs during the manufacturing process.

The screen of the cathode ray tube is usually a mechanical mixture of blue and yellow fluorescent phosphor crystals. The particular shades of blue and yellow used, and the relative amounts mixed are chosen to yield, by the principle of color addition, a desired shade of white. If it is assumed that the colors of the components remain substantially constant, then small variations in the resultant shade of white will occur in a predictable direction due to a variation in the relative amount of blue and yellow light emitted from a particular screen area. The resultant white color may be defined conveniently by the ratio of the amount of blue to yellow light. The total blue to yellow ratio range most usually employed is from 1.25 to 1.65. These ratio designations can also be correlated with other systems of color specifications, such as equivalent color temperature.

The ease of perceiving screen color non-uniformity under optimum conditions, such as in a darkened room and with a defocussed, blank raster on the cathode ray tube, varies with the abruptness of the color change, the size of the non-uniform areas, the viewing distance, the screen brightness and the physiological and the psychological condition of the observer. Because of these variations, the use of a human observer to estimate visually color non-uniformity, of the type described, is too subjective, and is highly inefficient and impractical.

It is, therefore, a principal object of the present invention to provide an improved objective method of color measurement which permits a substantially instantaneous appraisal of the color uniformity of the screen of a cathode ray tube.

Another object of the present invention is to provide an improved method of testing the color uniformity of a surface whose color is determined by two or more differently colored components.

A further object of the present invention is to provide an improved method of, and arrangement of apparatus for, deriving a substantially instantaneous determination of the variations in color, or shade of white, over the surface of a cathode ray tube phosphor screen.

It is a further object of the present invention to provide an improved method of testing the color uniformity of the screen of a cathode ray tube whereby to distinguish between the total amount and the relative amount of blue and yellow radiation.

Still another object of the present invention is to provide an improved method of testing the screen of a cathode ray tube for color non-uniformity, and an arrangement of apparatus therefor, which are simple in operation, objective in nature, economical in labor and cost of equipment, and highly efficient in use.

These and further objects of the present invention are attained in an improved method of, and an arrangement of apparatus for, testing the fluorescent screen of a cathode ray tube for color uniformity. The fluorescent screen of a monochrome cathode ray tube, comprising a mixture of blue and yellow phosphors, is scanned with a defocussed electron beam, thereby causing successive portions of the screen to fluoresce. Signal voltages are derived from blue and yellow light responsive photoelectric devices, through blue and yellow filters, respectively. The derived blue and yellow signal voltages are applied to the horizontal and vertical deflection circuits respectively, of an oscilloscope. A portion of the scan of the electron beam on the fluorescent screen is blanked in order to establish a zero signal reference level. The amplitude of each of the blue and yellow signal voltages is adjusted to the same quantity so that the trace appearing on the face of the oscilloscope is substantially a straight line passing through the center of the face and inclined at an angle of 45° to the horizontal. The length of the trace on the oscilloscope is adjusted to a predetermined distance. The trace is then amplified a predetermined amount and the overall width of the trace on each side of the 45° line, passing through the center of the oscilloscope, is observed. If the fluorescent screen color of the cathode ray tube being tested is perfectly uniform, the trace on the oscilloscope will be a straight line making an angle of 45° with the horizontal. If the color uniformity of the screen, on the other hand, is non-uniform, a meandering trace is displayed on the face of the oscilloscope. The overall width of this meandering trace, from both sides of a center line making an angle of 45° with the horizontal, is proportional to the color ratio difference of the phosphors of which the screen is composed.

The novel features of the present invention, as well as the invention itself, both as to its organization and method of operation, will be understood in detail from the following description when considered in connection with the accompanying drawing, in which similar reference numerals refer to similar elements, and in which:

Fig. 1 is a schematic diagram of apparatus for testing the color uniformity of a cathode ray tube screen, in accordance with the present invention, Fig. 2 represents a figure eight scanning trace on the face of the cathode ray tube screen being tested, and, Figs. 3, 4, 5 and 6 represent traces on an oscilloscope which may be observed while carrying out the method of the present invention.

Referring now to Fig. 1, there is shown a cathode ray tube 10 having a fluorescent screen 12 whose color uniformity it is desired to test. For most monochrome television viewing, the screen 12 comprises a mechanical mixture of blue and yellow fluorescing phosphor crystals. Depending upon the use for which the cathode ray tube 10 is intended, the blue to yellow ratio range is from about 1.25 to 1.65. If two areas on the same screen 12 differ by 0.05 in the blue to yellow ratio, a definite difference in color will be observed by the normal eye.

Energization and scanning circuits 14 are connected to the cathode ray tube 10 in order to scan the screen 12 with an electron beam in any desired manner well known in the art. Means are provided to derive separate electrical signal voltages from the blue and yellow light, respectively, emitted from the fluorescent screen 12 when it is bombarded by the electron beam of the cathode ray tube 10 during its scanning period. To this end, a photoresponsive device, such as a photoelectric tube 16, is positioned behind a blue filter 18 in a manner to receive the light emanating from the blue phosphor crystals on the screen 12 of the cathode ray tube 10. The filter 18 may be a blue Wratten No. 47 filter. A photoelectric device 20, similar to the photoelectric tube 16, is positioned behind a yellow filter 22 to receive the yellow light from the yellow phosphor crystals on the screen 12 of the cathode ray tube 10. The filter 22 may be a yellow Wratten No. 21 filter. Through the photoelectric tubes 16 and 20 are shown as simple photoelectric devices, they may be multiplier phototubes of the 6199 type. Multiplier phototubes of the latter type have given very satisfactory results in the method and apparatus of the present invention. The cathodes of the tubes 16 and 20 are connected to the negative terminal of a regulated D. C. power supply 24. The anode of the tube 16 is connected to the positive terminal of the regulated D. C. power supply 24 through a variable load resistor 26. The anode of the tube 20 is connected to the positive terminal of the power supply 24 through a variable load resistor 30. The positive terminal of the power supply 24 is grounded. The anode of the tube 16 is connected to the horizontal deflection circuit of an oscilloscope 32, and the anode of the tube 20 is connected to the vertical deflection circuit of the oscilloscope 32. The screen, or the face 34, of the oscilloscope 32 may be marked with a line 36 passing through the center O of the face 34, and making a 45° angle with the horizontal. Lines 38 and 40, each substantially parallel to the line 36, and each spaced substantially the same distance from opposite sides thereof, are marked on the face 34 of the oscilloscope 32, for the purpose hereinafter appearing.

The method of testing a cathode ray tube screen for color uniformity, in accordance with the present invention, will now be described. Let it be assumed that the cathode ray tube 10 is one of the type used in home television receivers, and that it is desired to determine the color uniformity of its screen 12. The cathode ray tube 10 is operated to provide a slightly defocussed beam at about 10,000 volts accelerating potential, and 50 to 75 microamperes total current, by means of the circuits 14. The reason for a defocussed electron beam is to provide a wide spot and thereby prevent burning of the screen 12. The energization and scanning circuits 14 are such as to provide a figure eight trace on the screen 12 of the cathode ray tube 10. The pattern of a figure eight trace 42, as shown in Fig. 2, is used to simplify the interpretation of the information obtained, and to reduce the scanning rate variation inherent in standard television scanning methods. The figure eight trace 42 is adjusted to scan all four sides and to cross at the center of the screen 12. While a figure eight trace has been found to give satisfactory results, it will be understood that any other scanning patterns, well known in the art, may be used with the method of the present invention. The figure eight trace 42 of the present invention, provided by the circuits 14, is well known in the art, and is obtained by applying two sinewave voltages, in a harmonic relationship of one to two, and in phase quadrature, to the horizontal and vertical deflection elements (not shown) of the cathode ray tube 10. Apparatus and methods for obtaining a figure eight pattern are described in "Electronic Measurements," by Terman and Pettit, pages 215–220, McGraw-Hill Book Company, Inc., 1952.

A portion of the figure eight trace 42 is blocked out by a piece of black opaque tape 44, pasted on the screen 12 of the tube 10, in order to allow derived signal voltages from the tubes 16 and 20 to drop to substantially zero. An electronic blanking system could also be employed to accomplish this. The gain controls (not shown) of the horizontal and vertical deflection amplifiers of the oscilloscope 32 and the variable load resistors 26 and 30 (Fig. 1) are adjusted to produce a line 46 (Fig. 3), on the oscilloscope face 34, of a predetermined length and an angle of 45° to the horizontal. If the cathode ray tube screen 12 has perfect color uniformity, then the line 46, of Fig. 3, represents a condition of balance wherein the signals derived by the tubes 16 and 20 have, in effect, been made equal to each other and of the same absolute value. It will be noted that if the absolute light level of the cathode ray tube 10, under test, begins to vary, it will appear as a lengthening or shortening of the line 46, on the face 34 of the oscilloscope 32, but the 45° angle will remain unchanged. If a change in the blue to yellow light ratio occurs, however, the angle of the line will change, with little or no change in the length of the line. A trace on the face 34 of the oscilloscope 32, derived from signals from a screen wherein the blue to yellow light ratio is not constant, may appear as the trace 48, shown in Fig. 4. The substantially straight portion 50 of the trace 48 is the portion caused by the figure eight trace 42 passing behind the opaque tape 44 and causing the trace 42 to be blanked. It will be understood that a simultaneous change in the blue to yellow light ratio and in the absolute intensity of the light emitted from the cathode ray tube screen 12 will cause both the angle and the length of the trace obtained on the face 34 of the oscilloscope 32 to vary.

After adjusting the amplitude of the derived signal voltages from the tubes 16 and 20 to the same amount and obtaining the trace 46, in the case of a perfect tube, or the meandering trace 48, as in the case of a tube having a non-uniform screen color, the gain of the horizontal and vertical deflection signals is increased a definite amount. In practice, after the initial trace, such as the trace 48 has been adjusted to a predetermined length and to a 45° angle with the horizontal, it is amplified about ten times in order that it may fill substantially the face 34 of the oscilloscope 32. The amplified trace 51 now observed represents a plot of the vector sum of the intensity of the blue and yellow light from the fluorescent screen 12 of the cathode ray tube 10, under test. An elongation of the amplified trace along the 45° angle diagonal line 36 is interpreted as a variation in light intensity without color change, while a deflection to either or both sides of the diagonal line 36 represent changes in color.

The meandering trace 52, shown in Fig. 5, represents an amplified trace indicating relatively little deflection to either side of the diagonal line 36. The trace 52, therefore, represents a signal response indicating that the tube under test is acceptable. It will be noticed that the trace 52, in Fig. 5, does not extend beyond the parallel lines 38 and 40. The lines 38 and 40 represent the arbitrary limits of deviation allowable for an acceptable cathode ray tube, under test. The meandering trace 54, shown in Fig. 6, represents the amplified signal response from a tube wherein the blue to yellow phosphor ratio is not constant. It will be noted that the trace 54, of Fig. 6, extends beyond the arbitrary limit lines 38 and 40, and thereby represents a non-acceptable cathode ray tube; that is, a cathode ray tube whose screen color is non-uniform.

In accordance with the methods of the present invention, it is possible to locate specific areas on the screen 12 of the cathode ray tube 10, under test, by moving an opaque mask along the figure eight trace 42, in Fig. 2, and noting where a break occurs in the amplified oscilloscope traces, such as the traces 51, 52 and 54, in Figs. 4, 5 and 6. For example, the tape 44, which is, in effect, an opaque mask, blanks a portion of the figure eight trace 42, and causes the resultant amplified oscilloscope trace 51 to show a break represented by the narrow portion 53.

An empirical calibration may be carried out by testing a series of tubes which have been previously tested at certain specific areas with a spectroradiometer or other colorimeter. An absolute calibration, however, may be made by assuming real values for the blue and yellow signal voltages derived, and making use of known data on the relationship between the blue and yellow phosphor light ratio and equivalent color temperature. The location of the limit lines 38 and 40 on the face 34 of the oscilloscope 32 may then be drawn to represent differences in color in degrees Kelvin (°K.).

Thus, there has been shown and described, in accordance with the objects of the present invention, a highly improved and rapid method of testing cathode ray tube screens for color uniformity. A system has been described which employs a pair of blue and yellow sensitive photoelectric devices, the derived signals of which are observed as vertical and horizontal deflections on a conventional cathode ray oscilloscope. The signals observed on the oscilloscope indicate a vector presentation of the color information described. To simplify interpretation of the color information obtained, the screen under test is scanned with a figure eight pattern. The exact location of non-uniform areas on the fluorescent screen under test is determined by moving an opaque mask along the figure eight pattern of the fluorescent screen and noting where the break occurs in the oscilloscope trace that is being observed.

While the method of testing a surface for color uniformity, in accordance with the present invention, has been described in connection with the fluorescent screen of a cathode ray tube, for illustrative purposes only, it is obvious that the method may be used to test other surfaces composed of two light reflecting components. For instance, a surface comprising a mixture of yellow and blue pigment may be tested for color uniformity by scanning the surface, say in a figure eight pattern, with a flying spot scanner, in a manner well known in the art. In other words, the energization and scanning circuits 14 will comprise means for sweeping a surface with a flying spot scanner where the surface to be tested is not fluorescent. The separate electrical signals derived by the photoelectric means are treated in the same manner whether derived from reflected light or from fluorescent light, as explained.

What is claimed is:

1. A method of testing, with the aid of an oscilloscope, the fluorescent screen of a cathode ray tube for color uniformity, said screen comprising a mixture of two phosphors; said method comprising scanning said screen with an electron beam and causing selected, successive portions of said screen to fluoresce, deriving separate electrical signals simultaneously from the light emitted from each of said phosphors, respectively, blanking a portion of said scanning to establish a zero signal level, applying said separate signals to separate deflection circuits, respectively, of said oscilloscope, adjusting the amplitude of each of said separate signals to a predetermined amplitude and obtaining on said oscilloscope an elongated trace of a predetermined length and inclination, and measuring the width of said trace whereby to obtain an indication proportional to the ratio of one phosphor to the other.

2. A method of testing, with the aid of an oscilloscope, the fluorescent screen of a cathode ray tube for color uniformity, said screen comprising a mixture of two phosphors; said method comprising scanning said screen with an electron beam and causing selected, successive portions of said screen to fluoresce, deriving separate electrical signals simultaneously from the light emitted from each of said phosphors, respectively, blanking a portion of said scanning to establish a zero signal level, applying said separate signals to separate deflection circuits, respectively, of said oscilloscope, adjusting the amplitude of each of said separate signals to a predetermined amplitude and obtaining on said oscilloscope an elongated trace of a predetermined length and inclination, amplifying said trace a predetermined amount, and measuring the width of said trace thereby obtaining a function of the ratio of one phosphor to the other.

3. A method of testing, with the aid of an oscilloscope, the fluorescent screen of a cathode ray tube for color uniformity, said screen comprising a mixture of two phosphors; said method comprising scanning said screen with an electron beam and causing selected, successive portions of said screen to fluoresce, deriving separate electrical signals simultaneously from the light emitted from each of said phosphors, respectively, blanking a portion of said scanning to establish a zero signal level, applying said separate signals to separate deflection circuits, respectively, of said oscilloscope, adjusting the amplitude of each of said separate signals to a predetermined amplitude and obtaining on said oscilloscope an elongated trace of a predetermined length and inclination, and measuring the width of said trace whereby to obtain an indication proportional to the ratio of one phosphor to the other, said scanning being with a defocussed electron beam and in a figure eight pattern.

4. A method of testing, with the aid of an oscilloscope, the fluorescent screen of a cathode ray tube for color uniformity, said screen comprising a mixture of yellow and blue phosphors; said method comprising scanning said screen with an electron beam and causing selected successive portions of said screen to fluoresce, deriving separate electrical signals simultaneously from the light emitted from the yellow and blue phosphors, respectively, blanking a portion of said scanning to establish a zero signal level, applying said separate signals to separate deflection circuits, respectively, of said oscilloscope, adjusting the amplitude of each of said separate signals to a predetermined amplitude and obtaining on said oscilloscope an elongated trace of a predetermined length and inclination, amplifying said trace a predetermined amount, and measuring the width of said trace thereby obtaining a function of the ratio of one phosphor to the other, said scanning being with a defocussed electron beam.

5. A method of testing, with the aid of an oscilloscope, a surface for color uniformity, said surface comprising a mixture of two different light reflecting components; said method comprising scanning successive, selected portions of said surface and causing light to be reflected therefrom, deriving separate electrical signals simultaneously from the light reflected from each of said components, respectively, blanking a portion of said scanning to establish a zero signal level, applying said separate signals to separate deflection circuits, respectively, of said oscilloscope, adjusting the amplitude of each of said separate signals to a predetermined amplitude and producing an elongated trace of a predetermined length and inclination on said oscilloscope, and measuring the width of said trace whereby to obtain an indication proportional to the ratio of one component to the other.

6. A method of testing, with the aid of an oscilloscope, a surface for color uniformity, said surface comprising a mixture of two different light reflecting components; said method comprising scanning successive, selected portions of said surface and causing light to be reflected therefrom, deriving separate electrical signals simultaneously from the light reflected from each of said components, respectively, blanking a portion of said scanning to establish a zero signal level, applying said separate signals to separate deflection circuits, respectively, of said oscilloscope, adjusting the amplitude of each of said separate signals to a predetermined amplitude and producing an elongated trace of a predetermined length and inclination on said oscilloscope, amplifying said trace a predetermined amount, and measuring the width of said trace thereby obtaining a function of the ratio of one component to the other.

7. A method of testing, with the aid of an oscilloscope, a surface for color uniformity, said surface comprising a mixture of two different light reflecting components; said method comprising scanning successive, selected portions of said surface and causing light to be reflected therefrom, deriving separate electrical signals simultaneously from the light reflected from each of said components, respectively, blanking a portion of said scanning to establish a zero signal level, applying said separate signals to separate deflection circuits, respectively, of said oscilloscope, adjusting the amplitude of each of said separate signals to a predetermined amplitude and producing an elongated trace of a predetermined length and inclination on said oscilloscope, and measuring the width of said trace whereby to obtain an indication proportional to the ratio of one component to the other, said scanning being with a defocussed electron beam.

8. A method of testing, with the aid of an oscilloscope, a surface for color uniformity, said surface comprising a mixture of two different light reflecting components; said method comprising scanning successive, selected portions of said surface and causing light to be reflected therefrom, deriving separate electrical signals simultaneously from the light reflected from each of said components, respectively, blanking a portion of said scanning to establish a zero signal level, applying said separate signals to separate deflection circuits, respectively, of said oscilloscope, adjusting the amplitude of each of said separate signals to a predetermined amplitude and producing an elongated trace of a predetermined length and inclination on said oscilloscope, amplifying said trace a predetermined amount, and measuring the width of said trace thereby obtaining a function of the ratio of one component to the other, said scanning being with a defocussed electron beam and in a figure eight pattern.

9. Apparatus for testing a surface for color uniformity, said surface comprising a mixture of two different light reflecting components, said apparatus comprising means to scan selected, successive portions of said surface and to cause light to be reflected therefrom, a pair of light transparent filters each of a color of substantially the light reflected by each of said components, respectively, means to derive separate electrical signals simultaneously from the light transmitted through each of said filters, means to blank periodically said scanning whereby no light is reflected from said surface, an oscilloscope having horizontal and vertical deflection means, means to apply said signals derived from the light transmitted through one of said filters to one of said deflection means, and means to apply said signals derived from the light transmitted through the other of said filters to the other of said deflection means.

10. Apparatus for testing the fluorescent screen of a cathode ray tube for color uniformity, said screen comprising a mixture of two different phosphors, said apparatus comprising means to scan selected, successive portions of said screen with an electron beam whereby to cause said portions to fluoresce, a pair of light transmitting filters each a color adapted to transmit a relatively large amount of the light from each of said phosphors, respectively, when fluorescing, photoelectric means to derive separate signals simultaneously from the light transmitted through each of said filters, respectively, means to blank periodically said scanning, an oscilloscope having horizontal and vertical deflection means, and means to apply said separate signals to said horizontal and vertical deflection means, respectively.

References Cited in the file of this patent

UNITED STATES PATENTS

| 2,490,812 | Huffman | Dec. 13, 1949 |
| 2,499,039 | Simmon | Feb. 28, 1950 |
| 2,623,432 | Lange | Dec. 30, 1952 |